United States Patent [19]

Park

[11] Patent Number: 5,777,698
[45] Date of Patent: Jul. 7, 1998

[54] APPARATUS FOR REDUCING MOIRE INTERFERENCE IN COLOR CATHODE RAY TUBES

[75] Inventor: Kwang Ho Park, Kyoungsangbuk-Do, Rep. of Korea

[73] Assignee: Intelpros, Seoul, Rep. of Korea

[21] Appl. No.: 615,447

[22] Filed: Mar. 14, 1996

[30] Foreign Application Priority Data

Mar. 17, 1995 [KR] Rep. of Korea ............ 1995-05619

[51] Int. Cl.$^6$ .................................................. H04N 5/21
[52] U.S. Cl. ............................ 348/809; 348/607; 348/806; 315/370; 315/382.1
[58] Field of Search ............................ 348/806, 808, 348/807, 809, 745, 746, 747, 607, 189, 190; 358/454; 315/370, 371, 382.1, 382; H04N 5/21, 17/04

[56] References Cited

U.S. PATENT DOCUMENTS

| | | | |
|---|---|---|---|
| 5,430,502 | 7/1995 | Yamazaki et al. | 348/806 |
| 5,440,353 | 8/1995 | Yamazaki et al. | 348/806 |
| 5,473,223 | 12/1995 | Murakami | 315/367 |

OTHER PUBLICATIONS

Moire Cancelation Circuit; Japio Abstract Accession No. 05015279 & JP 070307879 A (Hitachi) 21.22.95.
Method for Suppressing Moire Fringe Displayed on Color Cathode–Ray Tube; Japio Abstract Accession No. 03495994 & JP 030158894 A (Hitachi) Jul. 8, 1991.
Method and Device for Canceling Moire; Japio Abstract Accession No. 04469277 & JP 060113177 A (Sony) Apr. 22, 1994.

Primary Examiner—Michael H. Lee
Attorney, Agent, or Firm—Oppenheimer Wolff & Donnelly LLP

[57] ABSTRACT

An apparatus for reducing Moiré interference in a color cathode ray tube produced due to inconsistent spacing of scanning lines with respect to the dot pitches of a shadow mask during the display of video signals. The apparatus includes a sync signal dividing section for dividing by 2 horizontal and vertical sync signals separated from an input video signal, a vertical position control signal output section for outputting to a vertical position control section a voltage signal which varies according to a scanning Moiré control signal selectively inputted by a user, and a horizontal position control signal output section for outputting to a horizontal oscillation control section a voltage signal which varies according to a video Moiré control signal selectively inputted by the user, so that the vertical position of the even or odd scanning lines as well as the horizontal position of the even or odd image dots are adjusted to suppress the Moiré interference.

9 Claims, 4 Drawing Sheets

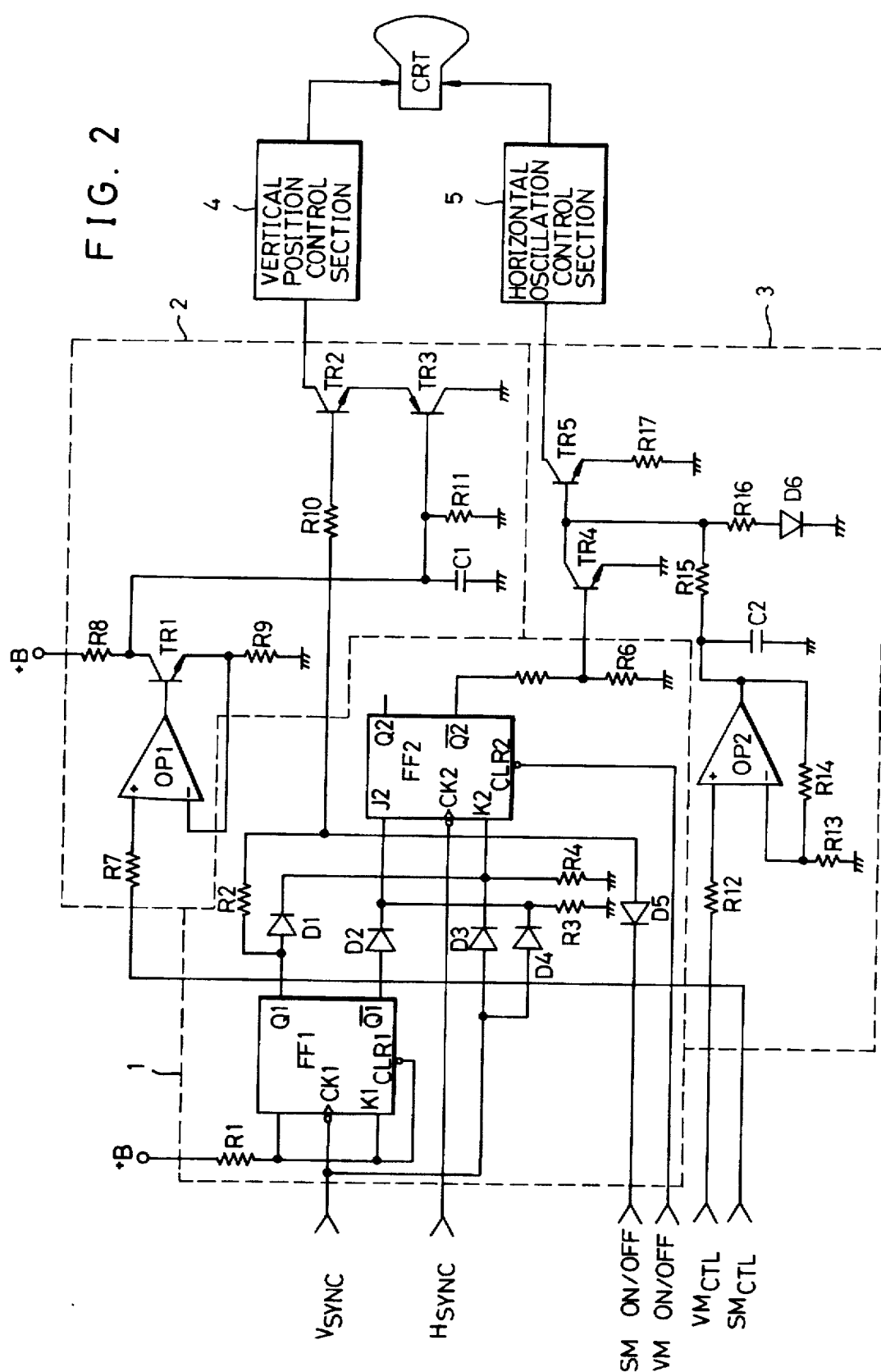
F I G. 2

FIG. 3A V$_{SYNC}$
FIG. 3B H$_{SYNC}$
FIG. 3C Q1
FIG. 3D $\overline{Q1}$
FIG. 3E J2
FIG. 3F K2
FIG. 3G Q2
FIG. 3H $\overline{Q2}$

APPARATUS FOR REDUCING MOIRE INTERFERENCE IN COLOR CATHODE RAY TUBES

BACKGROUND OF THE INVENTION

1. Field of the Invention

The present invention relates to an apparatus for reducing the Moiré interference patterns on color cathode ray tubes (CRTs). More particularly, the present invention relates to an apparatus for visually suppressing the Moiré interference phenomenon on color CRTs which is a periodic visual interference wave pattern produced due to inconsistent spacing of the scanning lines with respect to the dot pitches of the CRT during the display of certain video signals.

2. Description of the Prior Art

Color cathode ray tubes (CRTs) typically employ three electron guns for the primary colors of red, green, and blue. The CRTs use a shadow mask to selectively illuminate a matrix of each electron gun's respective colored phosphors of red, green, and blue.

According to a conventional color CRT as shown in FIG. 1, the electron beams 30 emitted from an electron gun portion 20 composed of three electron guns 10 for red, green, and blue colors disposed in a linear array or in a triangular array are deflected by a deflection magnetic field produced by a deflection coil 40, and are then directed to phosphor dots 90 of primary colors, i.e., red, green, and blue, applied on a screen surface 80, i.e., on the inner surface of a panel 70, through beam-passing perforations or apertures 60 provided in a shadow mask 50.

The shadow mask 50 is a metal foil with numerous apertures which allow the electron beam 30 sourced by the electron gun portion 20 to selectively strike its respective phosphor dot on the screen surface 80. The electron beam 30 is focused by magnetic lenses provided in the color CRT neck into a small spot before the electron beam 30 reaches the shadow mask 50. The electron beam 30 is typically larger than the size of the shadow mask aperture, so that the shadow mask 50 blocks part of the electron beam 30 and casts a smaller shadow of the original beam onto the desired phosphor. The dot pitch, or spacing, between adjacent shadow mask apertures, and their corresponding phosphor dots, must be as small as possible for the highest resolution CRT.

The spot size of the incident electron beam must be made as small as possible to increase the resolution of the display. The beam spot varies from a circular shape at small angles of deflection, e.g., near the center of the CRT screen, becoming more eccentric at higher angles of beam deflection, e.g., near the screen perimeter. If a video pattern of alternating on-off phosphors (i.e., pixels) is displayed, some of the pixels will be seen to be exactly aligned with the shadow mask and therefore will have uniform phosphor brightness across the dot, whereas other phosphors will exhibit a nonuniform brightness, a consequence of misalignment between electron beam and shadow mask aperture.

As the spot size of the electron beam is reduced while viewing the on-off pattern, a periodic visual interference pattern known as Moiré is produced in each video line scanned across the CRT. The Moiré interference pattern is also affected by beam current and beam focus produced during the operation of the video appliance which reproduces video signals, environmental illuminance, vertical over scanning, screen pitch, viewing distance, etc.

Meanwhile, in a video appliances capable of multimode display, the above-described Moiré interference phenomenon may also be produced due to the inconsistency of the spacing of the horizontal or vertical scanning lines with that of the dot pitches of the CRT if a horizontal frequency having a multimode resolution is applied to the dot pitches of the CRT. Particularly, if a focus function is enhanced in the CRT, the Moiré interference phenomenon is produced more severely, thereby reducing the resolution and the image quality.

Korean Patent Publication No. 91-7730 (Publication Date: Sep. 30, 1991) discloses a method of minimizing the Moiré phenomenon for cathode ray tubes. According to this method, the vertical pitch of the shadow mask is variably arranged to lower the visibility of the Moiré interference by shortening the wavelength of the Moiré beat frequency and scattering the Moiré pattern. However, such a conventional method suffers from the problems that, though it can reduce the Moiré effect, much lower resolution or luminance images must be displayed on the CRT. Further, the method fails to teach a selective suppression of the Moiré interference only when the Moiré interference pattern is produced on the CRT screen since it suppresses the Moiré interference by changing the structure and arrangement of the shadow mask.

SUMMARY OF THE INVENTION

The present invention has been made to solve the problems involved in the prior art. It is an object of the present invention to provide an apparatus for reducing Moiré interference in color cathode ray tubes which can visually reduce the Moiré interference by adjusting the vertical spacing of the scanning lines and the horizontal position of the CRT dots with respect to video signals having a multimode resolution.

In order to achieve the above object, there is provided an apparatus for reducing Moiré interference in a color cathode ray tube which comprises:

sync signal dividing means for dividing a vertical sync signal and a horizontal sync signal separated from an input video signal with a predetermined dividing rate;

vertical position control means for controlling a vertical position of even or odd scanning lines on a screen of said CRT in accordance with a first voltage signal inputted thereto;

horizontal oscillation control means for controlling a horizontal position of even or odd image dots on said CRT in accordance with a second voltage signal inputted thereto;

vertical position control signal output means, connected between said sync signal dividing means and said vertical position control means, for providing to said vertical position control means said first voltage signal for varying said vertical position of said even or odd scanning lines in accordance with a scanning Moiré control signal inputted by a user in a specific period of said vertical sync signal divided by said sync signal dividing means; and horizontal position control signal output means, connected between said sync signal dividing means and said horizontal oscillation control means, for providing to said horizontal oscillation control means said second voltage signal for varying said horizontal position of said even or odd image dots in accordance with a video Moiré control signal inputted by said user in a specific period of said horizontal sync signal divided by said sync signal dividing means.

BRIEF DESCRIPTION OF THE DRAWINGS

The above object, other features and advantages of the present invention will become more apparent by describing the preferred embodiment thereof with reference to the accompanying drawings, in which:

FIG. 2 is a schematic circuit diagram of the Moiré interference reducing apparatus for a color CRT according to the present invention.

FIGS. 3A to 3H are waveform diagrams appearing at various points in FIG. 1.

DETAILED DESCRIPTION OF THE PREFERRED EMBODIMENT

Figure 1:
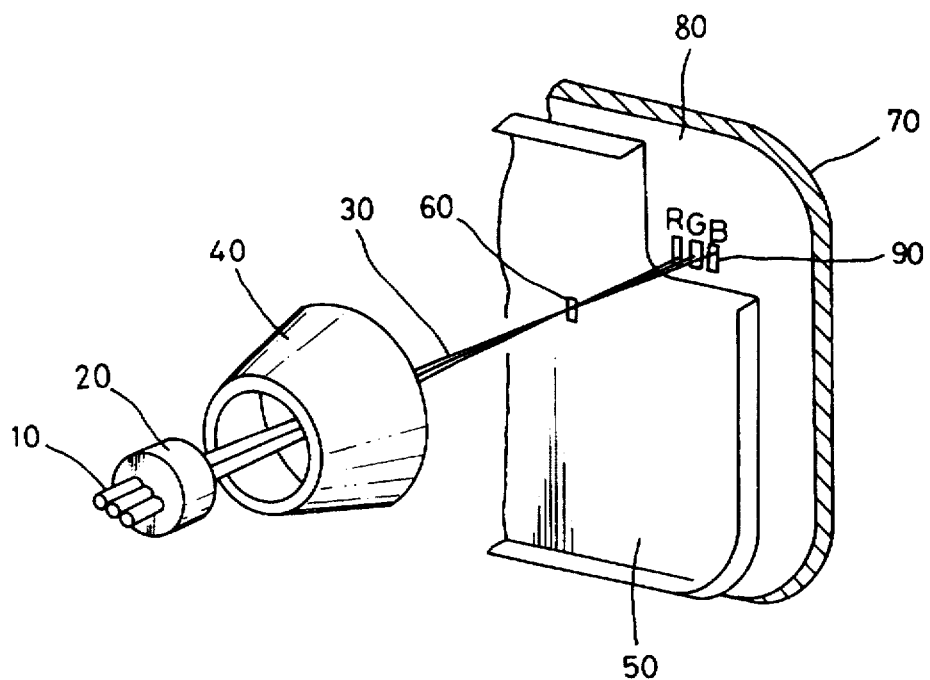
FIG. 1 is a perspective view showing a main portion of a color CRT.

FIG. 2 shows the construction of the Moiré interference reducing apparatus for a color CRT according to the present invention. Referring to FIG. 2, the Moiré interference reducing apparatus according to the present invention is provided with a sync signal dividing section 1 which is driven by a scanning Moiré on/off signal $SM_{on/off}$ and a video Moiré on/off signal $VM_{on/off}$ selectively inputted by a user, and divides by 2 the horizontal and the vertical sync signals $V_{sync}$ and $H_{sync}$ separated from an input video signal; a vertical position control signal output section 2 for outputting a first voltage signal, the level of which varies within a predetermined voltage range, in accordance with a scanning Moiré control signal $SM_{CTL}$ selectively inputted by the user during a specific period of the vertical sync signal divided by the sync signal dividing section 1; and a horizontal position control signal output section 3 for outputting a second voltage signal, the level of which varies within a predetermined voltage range, in accordance with a video Moiré control signal $VM_{CTL}$ selectively inputted by the user during a specific period of the horizontal sync signal divided by the sync signal dividing section 1.

The Moiré interference reducing apparatus according to the present invention is also provided with a vertical position control section 4 for controlling the vertical position of even or odd scanning lines on a screen in accordance with the first voltage signal inputted from the vertical position control signal output section 2; and a horizontal oscillation control section 5 for controlling the horizontal position of even or odd dots on the CRT in accordance with the second voltage signal inputted from the horizontal position control signal output section 3.

The operation of the Moiré interference reducing apparatus according to the present invention as constructed above will now explained with reference to FIGS. 2, 3A to 3H, 4A, 4B, 5A and 5B.

When the Moiré interference phenomenon is produced on the screen of the color CRT, a user may input a high level scanning Moiré on/off signal $SM_{on/off}$ and video Moiré on/off signal $VM_{on/off}$ to the present apparatus using a remote controller or a control button (not illustrated) provided on a control panel of the video appliance.

Referring to FIG. 2, the $B^+$ power supply voltage is supplied to the first input terminal J1, the second input terminal K1, and the clear terminal CLR1 of a first J-K-type flip-flop FF1 through a resistor R1, and the vertical sync signal $V_{sync}$ separated from the video signal is inputted to the clock input terminal CK1 of the first J-K-type flip-flop FF1 as a clock signal as shown in FIG. 3A. Since the first J-K-type flip-flop FF1 is clocked by the vertical sync signal $V_{sync}$, the first output from the first output terminal TR1 of the first J-K-type flip-flop FF1 comprises a half-frequency vertical sync signal, i.e., a signal of magnitude equal to, but with half the frequency of, the vertical sync signal as shown in FIG. 3C, while an inverted half-frequency vertical sync signal is outputted from the second output terminal Q1-bar of the first J-K-type flip-flop FF1 as shown in FIG. 3D. The half-frequency vertical sync signal, i.e., the vertical sync signal divided by 2, is then applied to the base of the transistor TR2 through resistors R2 and R10 to control the operation of the transistor TR2.

At the same time, the inverted half-frequency vertical sync signal outputted from the second output terminal Q1-bar of the first J-K-type flip-flop FF1 as shown in FIG. 3D is applied to the first input terminal J2 of a second J-K-type flip-flop FF2 through a diode D2, and the vertical sync signal $V_{sync}$ is also applied to the first input terminal J2 of the second J-K-type flip-flop FF2 through a diode D4. Accordingly, the output signal from the second output terminal Q1-bar of the first J-K-type flip-flop FF1 and the vertical sync signal $V_{sync}$ are logically summed, i.e., AND-gated, and the AND-gated signal as shown in FIG. 3E is applied to the first input terminal J2 of the second J-K-type flip-flop FF2.

Also, the signal as shown in FIG. 3C, which is outputted from the first output terminal Q1 of the first J-K-type flip-flop FF1, is applied to the second input terminal K2 of the second J-K-type flip-flop FF2, and the vertical sync signal $V_{sync}$ as shown in FIG. 3A is also applied to the second input terminal K2 of the second J-K-type flip-flop FF2 through a diode D3. Accordingly, the vertical sync signal $V_{sync}$ and the output signal from the output terminal Q1 of the first J-K-type flip-flop FF1 are logically summed, i.e., AND-gated, and this AND-gated signal as shown in FIG. 3F is applied to the second input terminal K2 of the second J-K-type flip-flop FF2.

At the same time, since the horizontal sync signal $H_{sync}$ as shown in FIG. 3B is applied to the clock input terminal CK2 of the second J-K-type flip-flop FF2 as its clock signal, signals as shown in FIGS. 3G and 3H are outputted from the first and second output terminals Q2 and Q2-bar of the second J-K-type flip-flop FF2. Specifically, half-frequency horizontal sync signals are outputted from the first and second output terminals Q2 and Q2-bar of the second J-K-type flip-flop FF2, respectively, during a period where the vertical sync signal $V_{sync}$ is in a 'high' level.

At this time, a user may input the scanning Moiré control signal $SM_{CTL}$ and/or video Moiré control signal $VM_{CTL}$ to suppress the scanning Moiré interference and/or the video Moiré interference. The scanning Moiré control signal $SM_{CTL}$ and the video Moiré control signal $VM_{CTL}$ can be freely adjusted within a predetermined voltage range by the user using a remote controller or a volume meter provided in the control panel.

Specifically, on the condition that both the scanning Moiré on/off signal $SM_{on/off}$ and the video Moiré on/off signal $VM_{on/off}$ have been applied to the apparatus, the scanning Moiré and the video Moiré which are produced on the screen of the CRT can be suppressed by adjusting the level of the scanning Moiré control signal $SM_{CTL}$ and the video Moiré control signal $VM_{CTL}$, respectively.

First, in order to suppress the scanning Moiré on the screen, the user adjusts the level of the scanning Moiré control signal $SM_{CTL}$, and the level-adjusted scanning Moiré control signal $SM_{CTL}$ is applied to the non-inverting (+) terminal of a comparator OP1. The comparator OP1 amplifies the difference voltage between the scanning Moiré control signal $SM_{CTL}$ and a reference voltage signal applied to its inverting (−) terminal with a predetermined amplification factor, and provides the amplified signal to the base of the transistor TR1.

Figure 4A:
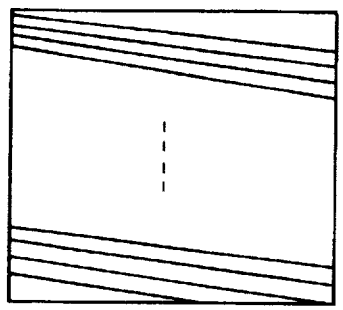
FIGS. 4A and 4B are views explaining the vertical position adjustment of scanning lines according to the present invention.

Accordingly, the amplification factor of the transistor TR1 is adjusted by the output of the comparator OP1, and thereby the base bias of the transistor TR3 is also determined. At this time, to the base of the transistor TR2, the half-frequency vertical sync signal as shown in FIG. 3C is applied, and during the period where the half-frequency vertical sync signal is in a 'low' level, the transistor TR2 is turned off to output no signal to the vertical position control section 4, resulting in that the vertical position of the odd scanning lines, i.e., scanning line 1, scanning line 3, . . . . which correspond to 'low' level periods of the half-frequency vertical sync signal, is fixed in upward and downward directions of the CRT as shown in FIG. 4A.

Figure 4B:
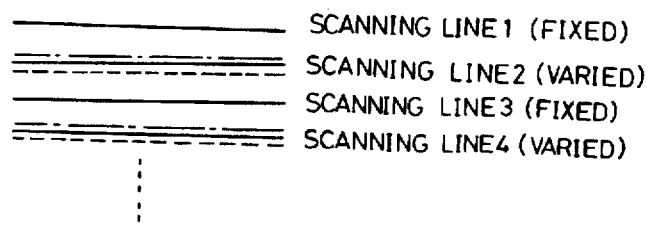

However, during the period where the half-frequency vertical sync signal is in a 'high' level, the amplification factor of the comparator OP1 and the transistor TR1 is adjusted in accordance with the voltage level of the scanning Moiré control signal $SM_{CTL}$, and thus the base bias of the transistor TR3 is adjusted by the output of the transistor TR1. Accordingly, the level of the control signal outputted from the transistor TR2 to the vertical position control section 4 is varied, and thus the vertical position of the even scanning lines, i.e., scanning line 2, scanning line 4, . . . . , is adjusted according to the control signal level as shown in FIG. 4B.

Thereafter, if a user adjusts the level of the video Moiré control signal $VM_{CTL}$ to suppress the video Moiré on the screen, the level-adjusted video Moiré control signal $VM_{CTL}$ is applied to the non-inverting (+) terminal of a comparator OP2. The comparator OP2 amplifies the difference voltage between the video Moiré control signal $VM_{CTL}$ and a reference voltage signal applied to its inverting (−) terminal with a predetermined amplification factor, and provides the amplified signal to the base of the transistor TR5.

At this time, the transistor TR4 is kept off during the period where the half-frequency horizontal sync signal as shown in FIG. 3H is in a 'low' level. Accordingly, the level of the control signal outputted from the transistor TR5 to the horizontal oscillation control section 5 is varied, and thus the horizontal position of the even dots, i.e., dot 2, dot 4, . . . . , is adjusted as shown in FIG. 5B.

However, during the period where the half-frequency horizontal sync signal as shown is FIG. 3H is in a 'high' level, the transistor TR4 is turned on, causing the transistor TR5 to be turned off regardless of the output of the comparator OP2.

Figure 5A:
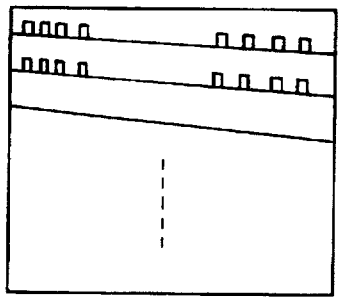
FIGS. 5A and 5B are views explaining the horizontal position adjustment of image dots according to the present invention.
Figure 5B:
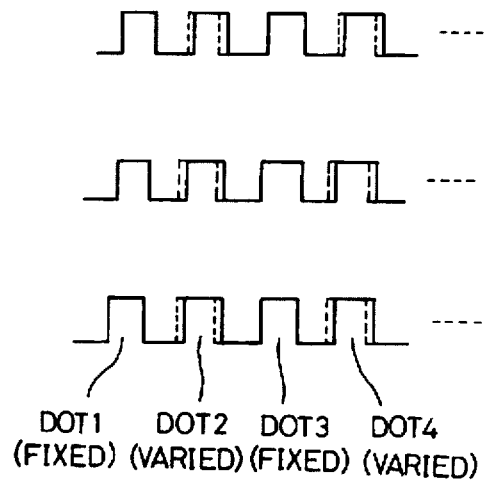

Accordingly, no signal is outputted to the horizontal oscillation control section 5, and thus the horizontal position of the odd dots, i.e., dot 1, dot 3, . . . . , which correspond to 'high' level periods of the half-frequency horizontal sync signal, is fixed in left and right directions of the CRT as shown in FIG. 5A.

Consequently, the vertical spacing of the entire scanning lines is adjusted by adjusting the vertical position of the even scanning lines, and then the horizontal spacing of the entire dots is adjusted by adjusting the horizontal position of the even dots, resulting in suppression of the Moiré interference.

Meanwhile, if it is not required to suppress the scanning Moiré and the video Moiré, the scanning Moiré on/off signal $SM_{on/off}$ and the video Moiré on/off signal $VM_{on/off}$ are cut off by the user. In this state, the transistors TR2 and TR5 are turned off, and thus the scanning position and the dot position are kept fixed.

From the foregoing, it will be apparent that the present invention provides the advantages in that the Moiré interference which is produced in displaying video signals having a multimode resolution can be reduced by a manual adjustment.

While the present invention has been described and illustrated herein with reference to the preferred embodiments thereof, it will be understood by those skilled in the art that various changes in form and details may be made therein without departing from the spirit and scope of the invention.

What is claimed is:

1. An apparatus for reducing Moiré interference in a color cathode ray tube comprising:

sync signal dividing means for dividing a vertical sync signal and a horizontal sync signal separated from an input video signal with a predetermined dividing rate;

vertical position control means for controlling a vertical position of even or odd scanning lines on a screen of said cathode ray tube in accordance with a first voltage signal inputted thereto;

horizontal oscillation control means for controlling a horizontal position of even or odd image dots on said cathode ray tube in accordance with a second voltage signal inputted thereto;

vertical position control signal output means, connected between said sync signal dividing means and said vertical position control means, for providing to said vertical position control means said first voltage signal for varying said vertical position of said even or odd scanning lines in accordance with a scanning Moiré control signal inputted by a user in a specific period of said vertical sync signal divided by said sync signal dividing means; and horizontal position control signal output means, connected between said sync signal dividing means and said horizontal oscillation control means, for providing to said horizontal oscillation control means said second voltage signal for varying said horizontal position of said even or off image dots in accordance with a video Moiré control signal inputted by a user in a specific period of said horizontal sync signal divided by said sync signal dividing means.

2. The apparatus as claimed in claim 1, wherein said sync signal dividing means comprises first and second J-K-type flip-flops operated by a scanning Moiré on/off signal and a video Moiré on/off signal, respectively, which are selectively inputted by said user.

3. The apparatus as claimed in claim 2, wherein each of said first and second J-K-type flip-flops has first and second input terminals, and produces a first output signal and a second output signal which is an inverted signal of said first output signal.

4. The apparatus as claimed in claim 2, wherein said second output signal of said first J-K-type flip-flop and said vertical sync signal are AND-gated and the AND-gated signal is inputted to said first input terminal of said second J-K-type flip-flop; and wherein said first output signal of said first J-K-type flip-flop and said vertical sync signal are AND-gated and the AND-gated signal is inputted to said second input terminal of said second J-K-type flip-flop.

5. The apparatus as claimed in claim 1, wherein said vertical position control signal output means comprises:

a first transistor for providing said first output signal of said first J-K-type flip-flop;

a first comparator for amplifying the difference voltage between said scanning Moiré control signal and a reference voltage signal with a predetermined amplification factor;

a second transistor which is driven by an output signal of said first comparator; and a third transistor for selectively providing an output signal of said first transistor to said vertical position control means in accordance with an output signal of said second transistor.

6. The apparatus as claimed in claim 1, wherein said horizontal position control signal output means comprises:

a first transistor for providing said second output signal of said second J-K-type flip-flop;

a comparator for amplifying the difference voltage between said video Moiré control signal and a reference voltage signal with a predetermined amplification factor; and a second transistor for selectively providing an output signal of said fourth transistor to said horizontal oscillation control means in accordance with an output signal of said second amplifier.

7. The apparatus as claimed in claim 1, further comprising means for varying said scanning Moiré control signal and said video Moiré control signal.

8. The apparatus as claimed in claim 7, wherein said varying means comprises a volume meter.

9. The apparatus as claimed in claim 7, wherein said varying means comprises a remote controller.

* * * * *

UNITED STATES PATENT AND TRADEMARK OFFICE
CERTIFICATE OF CORRECTION

PATENT NO. : 5,777,698
DATED : July 7, 1998
INVENTOR(S) : Kwang Ho PARK

It is certified that error appears in the above-identified patent and that said Letters Patent is hereby corrected as shown below:

On the title page, item [73] Assignee:

The named Assignee is changed to --LG Electronics Inc., Seoul, Rep. of Korea--.

Signed and Sealed this

Sixteenth Day of February, 1999

Attest:

Attesting Officer

*Acting Commissioner of Patents and Trademarks*